(12) United States Patent  
Shimomura

(10) Patent No.: US 6,578,132 B1
(45) Date of Patent: Jun. 10, 2003

(54) SEMICONDUCTOR STORAGE DEVICE AND PROGRAM AUTHENTICITY DETERMINING SYSTEM

(75) Inventor: Masaru Shimomura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 168 days.

(21) Appl. No.: 09/726,222

(22) Filed: Nov. 28, 2000

(30) Foreign Application Priority Data

Jan. 25, 2000 (JP) ........................................ 2000-015227

(51) Int. Cl.[7] ........................... G06F 12/02; G06F 12/14
(52) U.S. Cl. ....................... 711/220; 711/163; 711/216
(58) Field of Search ........................ 711/102–103, 152, 711/163, 202, 211, 219, 220, 205, 216

(56) References Cited

U.S. PATENT DOCUMENTS 6,101,587 A * 8/2000 Kim ............................ 711/163
6,230,244 B1 * 5/2001 Kai .............................. 711/164
6,336,585 B1 * 1/2002 Harada ........................ 235/380
6,397,317 B1 * 5/2002 Kusutaki ..................... 711/202

FOREIGN PATENT DOCUMENTS

JP     2-31256     2/1990

* cited by examiner

Primary Examiner—Gary Portka
(74) Attorney, Agent, or Firm—Nixon & Vanderhye P.C.

(57) ABSTRACT

The invention prevents execution of unauthorized copies of programs. In one example embodiment, a semiconductor storage device includes a program ROM. A calculator of an address processing unit included in the program ROM processes lower bits (e.g., A0–A7) of a first address from an address bus of a CPU using an address calculation code e.g., (a0–a7) from a code storing unit. The calculator outputs a modified lower address (e.g., A0'–A7'). A selector may selectively replace the original lower address (e.g., A0–A7) with the modified lower address (e.g., A0'–A7') As a result of the replacement, a second address is output from the address processing unit different from the first address.

41 Claims, 8 Drawing Sheets

SEMICONDUCTOR STORAGE DEVICE AND PROGRAM AUTHENTICITY DETERMINING SYSTEM

RELATED APPLICATION

This application is related to application Ser. No. 09/722,375, entitled "Semiconductor Storage Device and Program Discrimination System", which application is incorporated herein by reference.

FIELD OF THE INVENTION

The present invention relates to a semiconductor storage device and a program authenticity determining system using the same. More specifically, the present invention relates to a semiconductor storage device such as a ROM which stores a program in, for example, a cartridge for a game machine, and an authenticity determining system for the program.

BACKGROUND AND SUMMARY OF THE INVENTION

A cartridge (for example) for a game machine includes a semiconductor storage device such as a ROM in which a game program is written, and is attached, while in use, to a game machine body. Especially, in the case of a popular cartridge, the market is often infested with non-authentic imitations where the game program is unlawfully copied.

As disclosed in Japanese Patent Laying-open No. 2-31256 [G06F 12/14], the applicant proposed an "Address Decoding" system capable of preventing the game program and other programs from being unlawfully copied or the data from being changed by determining the authenticity of a cartridge and by inhibiting access to a program memory where the cartridge is not authentic.

In the above-described prior art, by using an "Address Decoding Method", the authenticity is determined in accordance with program data actually read from the program memory, and therefore, it is possible to remove the imitations with a high degree of reliability. However, in the above-described prior art, it is necessary to decode a number of addresses. In such a system, if the addresses to be decoded are analyzed by a copyist, the protective effect against the unlawful utilization of the program may be lost.

SUMMARY OF THE INVENTION

Therefore, a principal feature of the illustrative embodiments is to provide a novel semiconductor storage device and a program authenticating system using the same.

Another feature of the illustrative embodiments of the present invention is to provide a semiconductor storage device capable of making an analysis of a program more difficult and providing a lasting protective effect, and to provide a program authenticating system using the same.

A semiconductor storage device according to the illustrative embodiments of the present invention is a semiconductor storage device in which program data to be executed by a central processing unit is fixedly stored and which outputs the program data from addresses designated by address data, comprising: a program data store for fixedly storing the program data; a code generator for generating an address calculation code; and an address processing circuitry which receives first address data output from the central processing unit, wherein the address processing circuitry outputs new second address data obtained by performing calculation on at least a portion of the first address data on the basis of the address calculation code at a time that a control signal exists and applies the second address data to the program data storing means, and applies the first address data to the program data store at a time that no control signal exists.

Specifically, the address processing circuitry includes calculating circuitry capable of outputting the second address data by calculating at least the portion of the first address data by using the address calculation code, and a selector which outputs the second address data when the control signal is applied to the selector and outputs the first address data when the control signal is not applied to the selector.

The calculating circuitry may include a plurality of calculators capable of performing different kinds of calculations, respectively and thus outputting different kinds of second address data, respectively on reception of the first address data and the address calculation code, and the code generator further generates a calculator selection code by which any one of the plurality of calculators can be selected, and the selector may select the second address data associated with the calculator selected by the calculator selecting code, or the first address data.

In accordance with one aspect of the illustrative embodiments, a semiconductor storage device comprises a program data store for fixedly storing program data; a code generator for generating an address calculation code; and address processing circuitry which receives first address data output from a central processing unit, wherein the address processing circuitry outputs new second address data obtained by performing a first calculation on at least a portion of the first address data based upon the address calculation code at a time that a control signal exists and applies the second address data to the program data storing means, and outputs new third address data obtained by performing a second calculation different from the first calculation on at least a portion of the first address data based upon the address calculation code at a time that no control signal exists and applies the third address data to the program data store.

One of the first calculation and the second calculation performed by the address processing circuitry converts the first address data into address data for outputting program data that is to be regularly executed by the central processing unit.

A program discrimination system according to an illustrative embodiment comprises a read-only program storage unit which fixedly stores program data and a central processing unit which executes the program data by reading the program data from the program storage unit and determines whether or not the program is a regular, authentic program, and wherein the program storage unit includes a program data store for fixedly storing the program data, a code generator for generating an address calculation code, and address processing circuitry for receiving first address data output from the central processing unit, wherein the address processing circuitry outputs new second address data obtained by performing a calculation on at least a portion of the first address data based upon the address calculation code when a control signal is applied from the central processing unit and applies the second address data to the program data store, and applies the first address data to the program data store when no control signal is applied, and the central processing unit including control signal applying circuitry for applying the control signal to the address processing circuitry of the program storage unit, an address output circuit for outputting the first address data to apply the first address data to the address processing circuitry just after the control signal is applied, and a circuitry for determining the authenticity of the program storage unit by determining whether or not a predetermined relationship exists between the program data read from the program data storing means in accordance with the second address data and check data that is set in advance.

The central processing unit further includes a program terminator for forcedly terminating the program when the determined result indicates a false program storage unit.

In the semiconductor storage device, when the control signal which is output from the central processing unit in response to specific program data read from the program data store is applied to the address processing circuitry, the address processing circuitry outputs the second address data by performing a calculation on all bits or a subset thereof of the first address data based upon the address calculation code from the code generator and applies the second address data to the program data storing means. Specifically, the calculating circuitry of the address processing circuitry calculates the first address data by using the address calculation code so as to output the second address data, and the selector outputs the second address data in response to the control signal. Therefore, from the program data storing circuitry, in response to the control signal, the program data is read from an address that is designated by not the first address data output from the central processing unit but the second address data outputted from the address processing output.

The central processing unit determines by the determining circuitry whether or not the program data read-out in accordance with the second address data is coincident with preset check data. If the data is coincident, the determining circuitry determines that the semiconductor storage unit (program ROM) at that time is authentic. If the data is not coincident, the semiconductor storage device is not authentic, and therefore, the program is terminated.

Accordingly, even if all the program data being stored in the program data store is copied, in a case where the address processing circuitry according to the present exemplary embodiments is not provided, the program storage unit is determined as an imitation according to a result of the program check. It is therefore impossible to execute the program.

In addition, when a plurality of calculators capable of executing different kinds of calculations, respectively are provided in the address processing circuitry, the selector selects the second address data from a calculator selected by the calculation selection code output from the code generator.

Furthermore, the second address data may be obtained by processing the first data using the first calculation when the control signal exists or the third address data that is a result of the processing of the first address data through the second calculation when no control signal exists. In this case, one of the first calculation and the second calculation in the address processing circuitry converts the first address data into regular address data for outputting program data to be regularly executed by the central processing unit.

In accordance with the illustrative embodiments, if only all the program data of the program data store are copied but all the elements such as the calculating circuitry and the calculation code in the address processing circuitry are not analyzed, the program data cannot be executed in a non-authentic product, and therefore, it is possible to effectively prevent the program from being unlawfully utilized.

Furthermore, in a case where the elements such as the kind of the calculation, the address calculation code in the calculating circuitry and the calculator selection code by which the calculator is designated are changed for each product or version of product, even if all the elements of a given product could be analyzed, an analysis result cannot be applied to another product as it is. It would be necessary for a person who intends to unlawfully use the program to analyze the modified elements on all such occasions. In view of the fact that a very long time and massive tools are needed for such analysis, in accordance with the illustrative embodiments, it is possible to substantially eliminate unlawful utilization of the program.

The above described objects and other objects, features, aspects and advantages of the present invention will become more apparent from the following detailed description of the present invention when taken in conjunction with the accompanying drawings.

DETAILED DESCRIPTION OF EXAMPLE EMBODIMENTS

Figure 1:
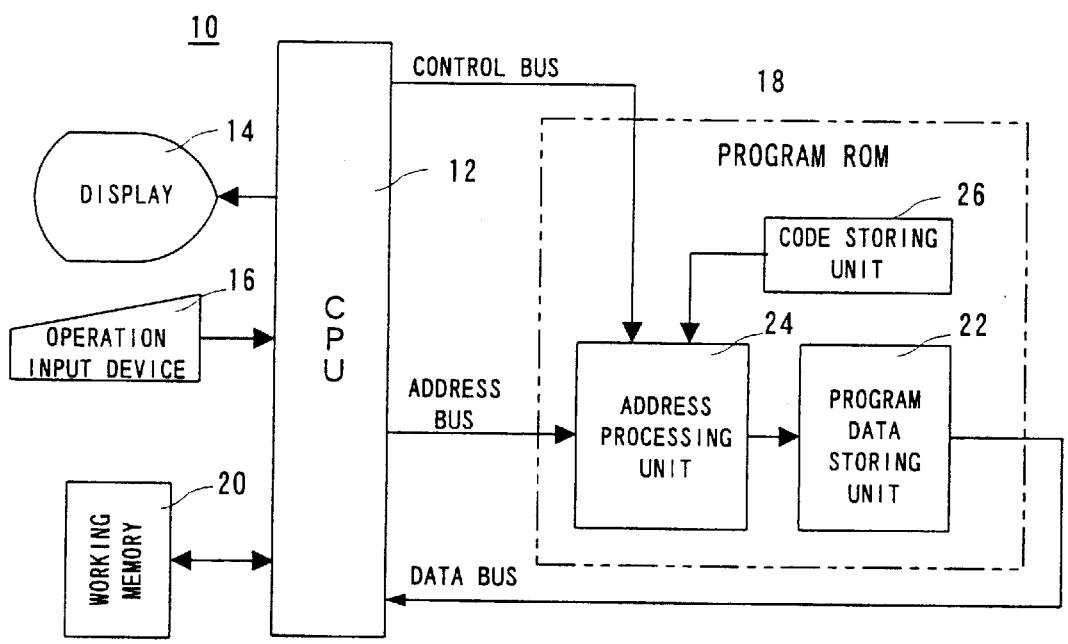
FIG. 1 is a block diagram showing one embodiment according to the present invention.

An information processing apparatus 10 of one embodiment according to the present invention is shown in FIG. 1 and includes a CPU 12 (a central processing unit), an output display device 14 and an operation input device 16 connected to CPU 12. The information processing apparatus 10 constitutes a program authenticating (discriminating) system. When the information processing apparatus 10 is a game processor, the operation input device 16 is a game controller which includes a joystick, a cross key and various kinds of operation control buttons. The game processor (i.e., the CPU 12) processes a game program stored in a program ROM 18 in response to the operation of the operation input device 16 so as to display a game image on the display device 14, which may be, for example, a television monitor or a liquid crystal display. In addition, a working memory 20 connected to the CPU 12 is a RAM and is utilized during the execution of the above-described program processing as necessary, and is utilized for temporarily storing a check program and check data for the program authenticity discrimination described below.

The program ROM 18 is a program storage unit that may be a read-only semiconductor memory such as a PROM, flash ROM, EPROM, EEPROM and etc. which fixedly stores the program data. The program ROM 18 includes an address processing unit 24 and a code storing unit 26 in addition to a program data storing unit 22 which is a memory such as a conventional program ROM. In the embodiment shown, the program data storing unit 22, the address processing unit 24 and the code storing unit 26 are provided on the same semiconductor chip. Furthermore, address data output from CPU 12 through an address bus is processed by the address processing unit 24, and the address processing unit 24 applies processed address data to the program data storing unit 22. The program data storing unit 22 reads-out the program data in accordance with the address data processed by the address processing unit 24, and the program data is outputted to the CPU 12 through a data bus.

In addition, as described below, the address processing unit 24 processes the address data based upon a control signal applied through a control bus from the CPU 12 and a code (data) applied from the code storing unit 26.

Figure 2:
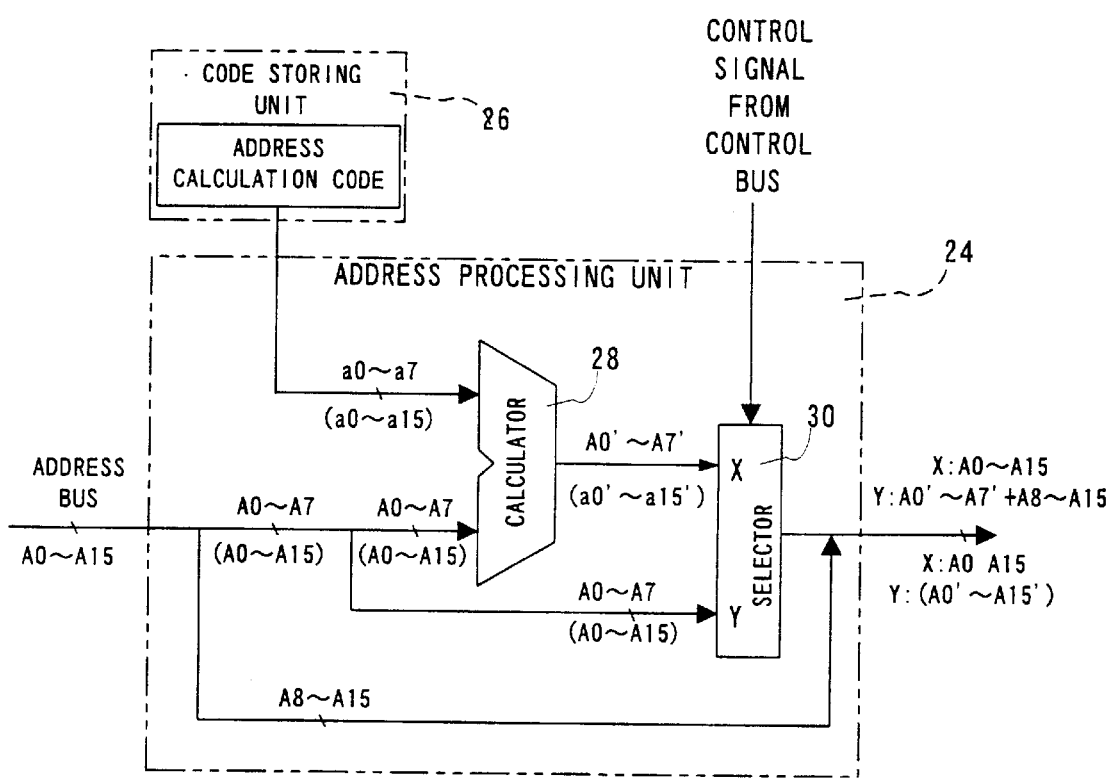
FIG. 2 is a block diagram showing one example of an address processing unit of FIG. 1 embodiment.

A specific example of the address processing unit 24 is shown in FIG. 2. As shown in FIG. 2, the address processing unit 24 includes a calculator 28 which functions as a calculating means, and a selector 30. The calculator 28 is formed within the chip of the program ROM 18, and may be a multiplier, a divider, a subtractor, an adder, a shift register, or an other simple logic calculator (for example, AND, NAND, OR, NOR, EX-OR or other logic circuitry).

For example, the upper 8 bits A8–A15 of first address data A0–A15 output from the CPU 12 are synthesized or coupled with output data A0'–A7' of a selector 30, and lower 8 bits A0–A7 are applied to one input of the calculator 28 and the selector 30 as one input (Y) thereof. To another input of the calculator 28, an 8 bit address calculation code a0–a7 being set in the code storing unit 26 which functions as a code generating means is applied. The calculator 28 executes anyone of the above-described kinds of calculations on two inputs, and an output from the calculator 28 is applied to another input (X) of the selector 30. In a case where the calculator 28 implements an AND logic operation, for example, the calculator 28 outputs a logical sum result A0'–A7' of the address calculation code a0–a7 and the lower 8 bits A0–A7 and applies the same to the above-described one input of the selector 30.

The control signal previously described, a write signal, for example is applied to selector 30 from the CPU 12. Therefore, the selector 30 replaces the lower 8 bits A0–A7 of the address data with the calculation result A0'–A7' in response to the control signal, i.e. the write signal and outputs replaced data. On the other hand, the upper 8 bits A8–A15 of the address data A0–A15 are coupled to the output of the selector 30. Accordingly, second address data of 16 bits in total of A0'–A7'+A8–A15 are output from the selector 30, i.e. the address processing unit 24.

Since the second address data thus modified or processed by the address processing unit 24 is input to the program data storing unit 22 (FIG. 1), in a step S12 shown in FIG. 5 and described below, program data is read from an address of the program data storing unit 22 designated by not the first address data A0–A15 but the second address data A0'–A7'+A8–A15. In a case of a non-authentic program ROM which does not have the address processing unit 24, program data is read from an address shown by the first address data A0–A15. Therefore, the program data read from the program data storing unit 22 become different for each other. In a case of an authentic program ROM, the program data read-out is coincident with the previously stored check data, but in the case of a non-authentic program ROM, the program data is not coincident with the check data.

In addition, in the FIG. 2 embodiment, only the lower 8 bits of the first address data are calculated with the calculation code by the calculator 28, and the upper 8 bits are output as they are; however, all the 16 bits of the first address data may be calculated in the calculator 28. In such an example, as shown in FIG. 2 with parentheses, all 16 bits of the address data A0–A15 are applied to the one input of the calculator 28, and to the other input of the calculator 28, an address calculation code a0–a15 from the code storing unit 26 is applied. Therefore, second address data A0'–A15' all the bits of which are modified or processed is output from the calculator 28, and the second address data A0'–A15' is applied to the one input (X) of the selector 30, and as the other input (Y) of the selector 30, the first address data A0–A15 output from the CPU 12 is applied. Therefore, from the selector 30, when the control signal exists the second address data A0'–A15' is output, and when the control signal does not exist the first address data A0–A15 is output. Therefore, as shown in a step S13 in FIG. 5, the propriety of the program data read from an address designated by the address data A0'–A15' may be determined.

Figure 3:
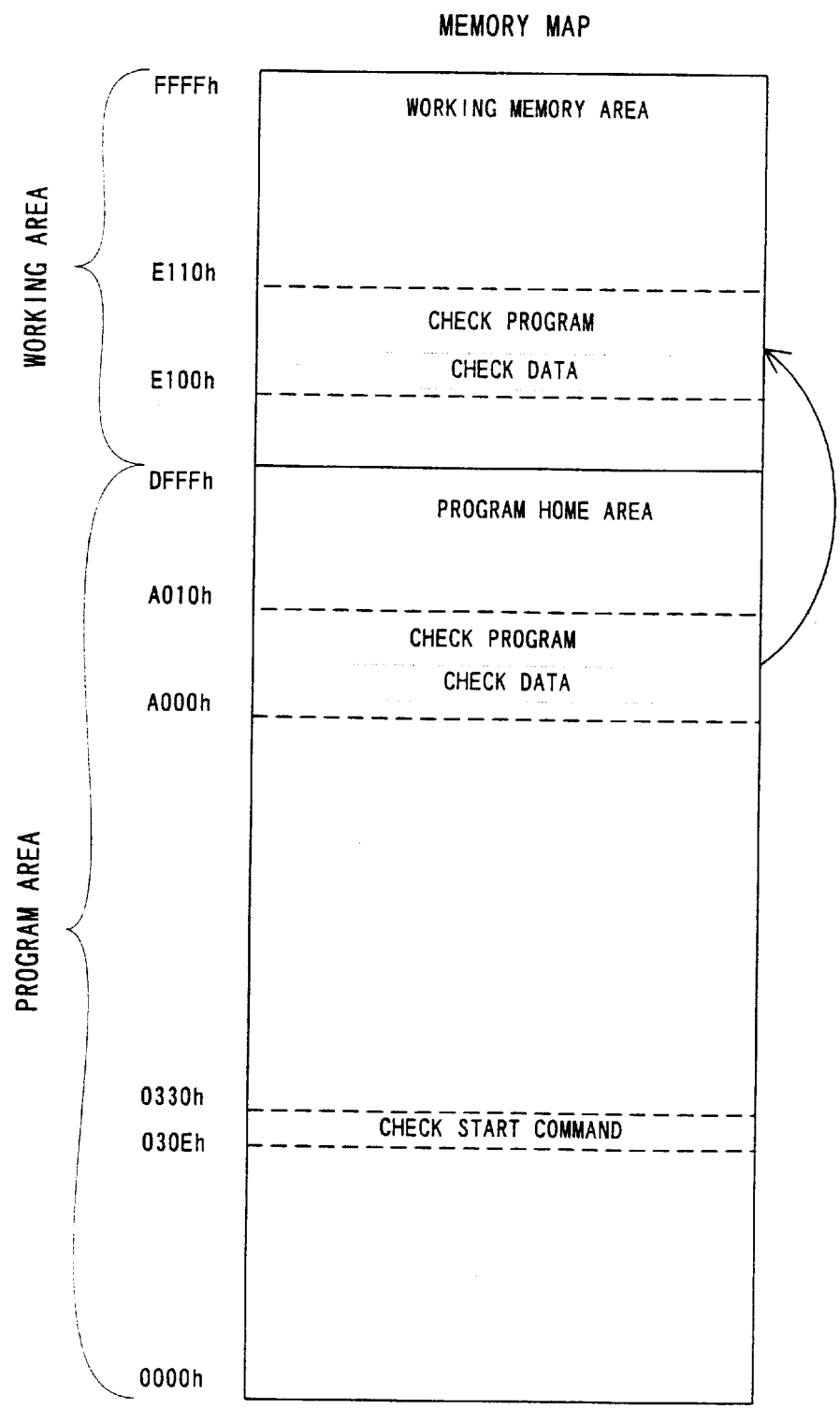
FIG. 3 is an illustrative view showing a memory map of the CPU in FIG. 1.

The CPU 12 in FIG. 1 has an associated memory map shown in FIG. 3. CPU 12 utilizes a memory space where, for example, "0000h–DFFFh" is a program area assigned to the program ROM 18, and a memory space of "E000h–FFFFh" is a working area assigned to the working memory 20.

The program data storing unit 22 of the program ROM 18 is a portion of the above-described program area, and the program area is further formed with a program stationing area or home area, a check program area and a check start command area. A check program stored in the check program area can be implemented based upon operations shown in flowcharts of FIG. 4 and FIG. 5 described below.

Furthermore, in the check program, one or a plurality of check data is set. The check data is data for discriminating the authenticity of the program by comparing with such data with a result of the execution of the check program. For example, in this embodiment shown, the authenticity of the program is checked only one time, and therefore, only one check data is set in the check program as illustrated in FIG. 3. By setting the check start command for starting the check program which utilizes the single check data in a plurality of places of a main program (game program, for example), or by setting a plurality of check start commands for respectively starting a plurality of check programs utilizing a plurality of check data in a plurality of places, it is possible to make the analysis of the program more difficult through checking of the authenticity of the program a plurality of times.

Furthermore, in a case where the check program is relatively small (a few to a few ten bytes, for example), it is preferable for making it more difficult to analyze the check program when the check start command is set in a plurality of places of the main program.

Figure 4:
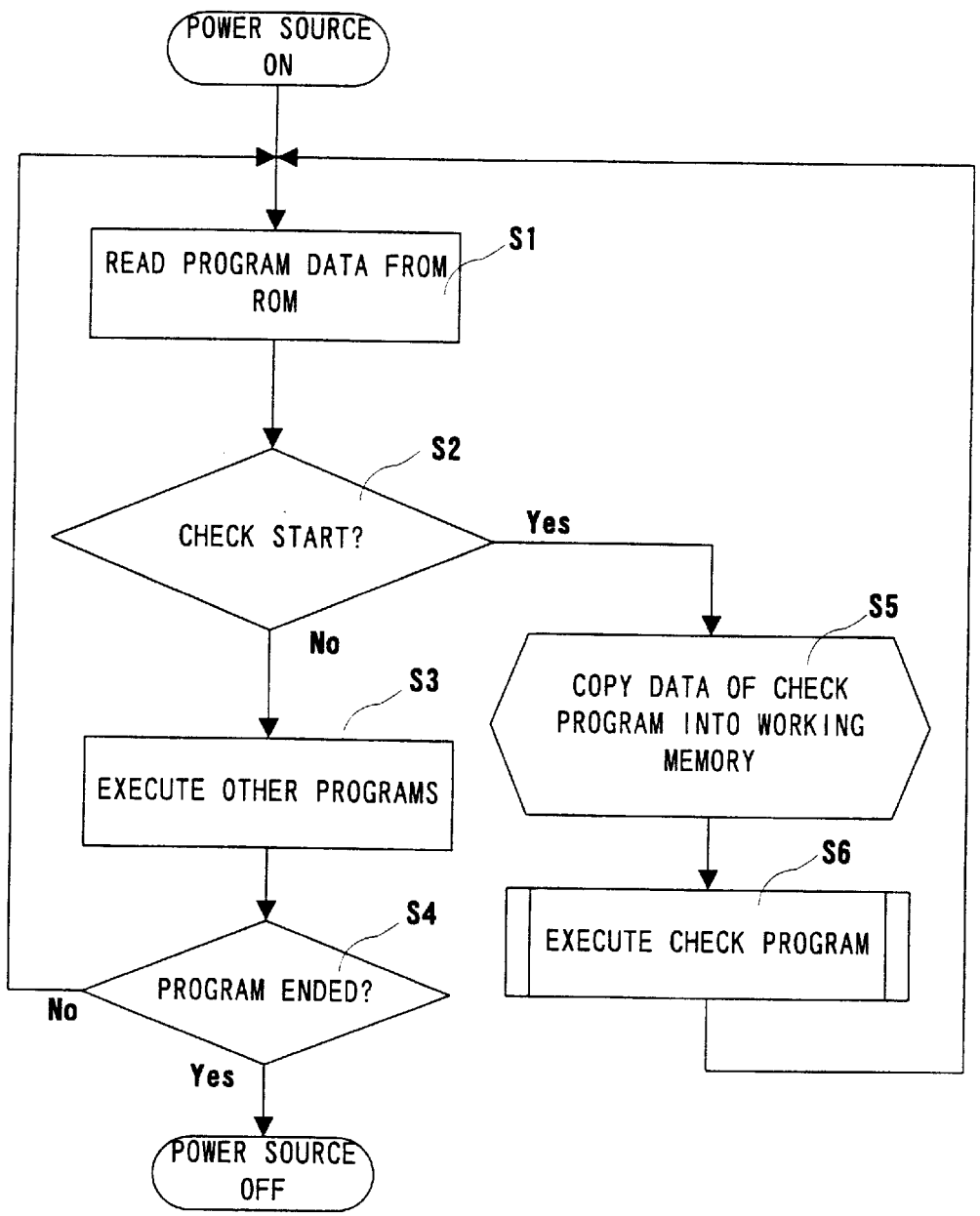
FIG. 4 is a flowchart showing an exemplary operation of the FIG. 1 embodiment.

Referring to FIG. 4, when a power source (not shown) of the information processing apparatus 10 is turned-on, a step S1 is first executed by the CPU 12. In the step S1, the CPU 12 reads the program data stored in the program data storing unit 22 of the program ROM 18 (FIG. 1). In a step S2, it is determined whether or not the read program data is specific program data which designates the execution of the authenticity check of the program.

If "NO" is determined at step S2, that is, if the program data is not the specific program data commanding the authenticity check, in a step S3, a process according to the program data at that time is executed. In a step S4, after the step S3, the CPU 12 determines whether or not the program is ended, and if "YES" is determined, the process is terminated, but if "NO", the process returns to the previous step S1. Thus, by repeating the steps S1–S4, the program stored in the program data storing unit 22 is sequentially executed. In this state, the control signal (the write signal, for example) is not applied to the selector 30 of the address processing unit 22, and therefore, a state that the input X is selected is held in the selector 30. Accordingly, the first address data output from the CPU 12 is applied to the program storing unit 22.

If the command for executing the check program is input to the CPU 12 during an operation where respective commands included in the program area are sequentially executed by repeating the steps S1–S4, this is determined at step S2, the process proceeds to a step S5. In a case where the command, i.e. the specific program data is set in an address "030Eh" as shown in FIG. 3, the CPU 12 proceeds to the step S5 at a time that the address is incremented to the address "030Eh".

In the step S5, the CPU 12 reads-in the check program and check data both set in the program area shown in FIG. 2, and writes or copies both into working memory 20. A step S6 is executed in accordance with the check program and the check data copied in the working memory 20. The check program copied in the working memory 20 is eliminated after a completion of the check.

Figure 5:
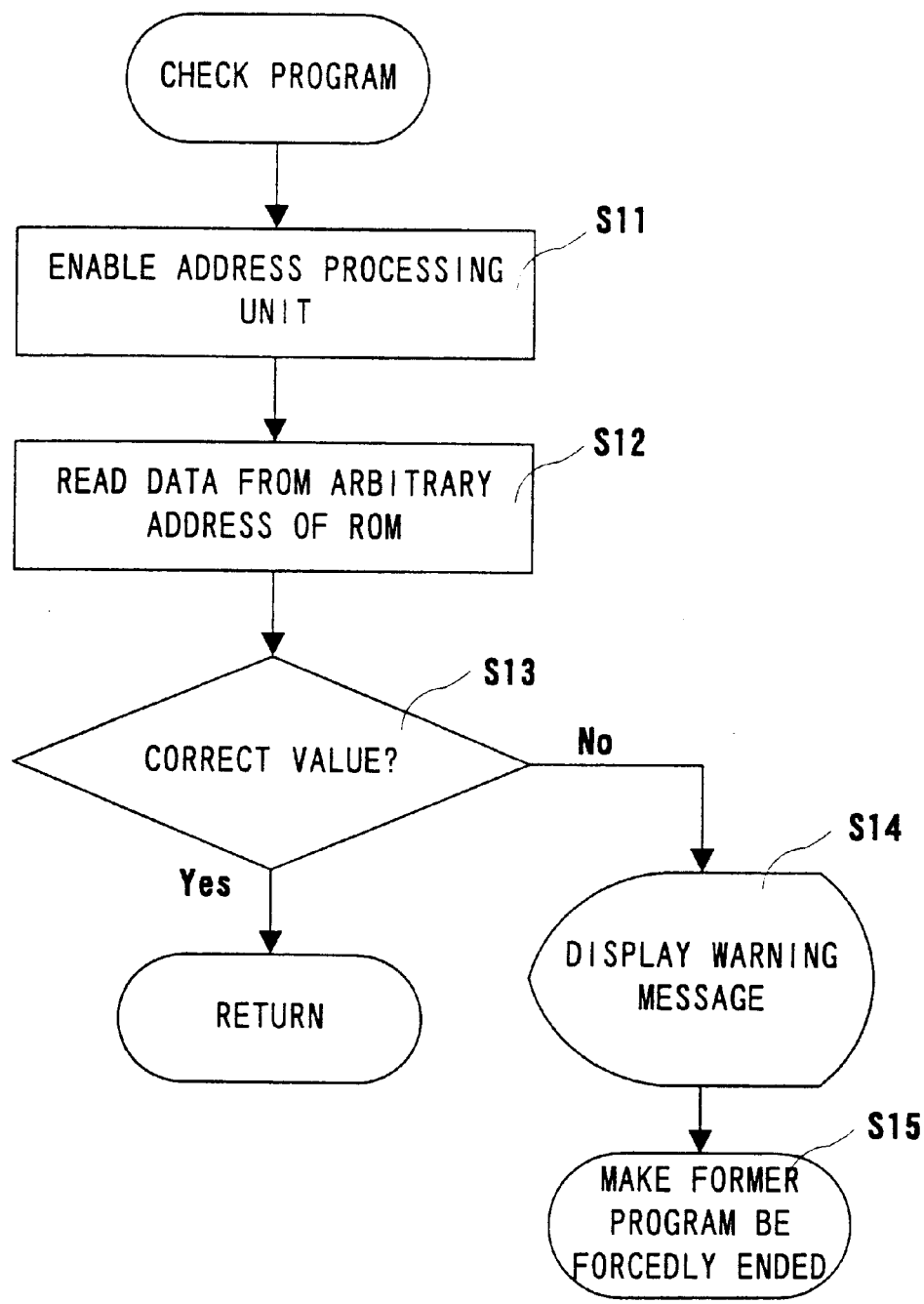
FIG. 5 is a flowchart showing an illustrative check program in FIG. 4 flowchart.

A subroutine of the step S6 is shown in FIG. 5 in detail. In a step S11, CPU 12 first generates the control signal via the control bus to enable the address processing unit 24 included in the program ROM 18 shown in FIG. 1. Specifically, CPU 12 applies the write signal (control signal) to the selector 30 of the program ROM 18 through the control bus. The write signal is not normally applied to a ROM (read-only memory) during the execution of the program of the ROM, and therefore, by outputting the write signal to the program ROM 18, the selector 30 of the address processing unit 24 is caused to select the input Y. The step S11 constitutes a control signal applying means.

In addition, instead of the above-described write signal being utilized as the control signal, a control signal may be applied to the selector 30 when the CPU 12 executes a specific address of the program data storing unit 22 of the program ROM 18. In such a case, although not shown, an address comparator which sequentially compares the address data output via the address bus from the CPU 12 with the specific address may be provided, and if it is detected that the both addresses are coincident with each other by the address comparator, the control signal is applied to the selector 30.

In a succeeding step S12, CPU 12 outputs the address data (the first address data) for reading the program data storing unit 22 of the program ROM 18. More specifically, just after the step S11 wherein the control is output, in the step S12 which functions as an address input means, the first address data is input to the address processing unit 24 as a ROM address through the address bus from the CPU 12, but the address processing unit 24 processes the first address data as described in FIG. 2 embodiment, and applies a processed result address (second address data) to the program ROM 18.

Then, in a step S13, it is determined whether or not the program data read from the program data storing unit 22 in accordance with the second address data processed by the address processing unit 24 is a true value. That is, the step S13 constitutes a determining means which determines whether or not the check data read from the working memory 20 and the program data are coincident with each other by comparing the data. It is expected that the program data read from the address which is processed in accordance with a predetermined relationship in the address processing unit 24 is coincident with the check data being set in advance. Therefore, in this case, "YES" is determined. However, in a case where a non-authentic program ROM which is not provided with the address processing unit 24, or a non-authentic program ROM in which a unit equal to the address processing unit 24 exists but the address processing is not in conformance with the predetermined relationship, "NO" is determined in the step S13.

Then, in a case where the authentic or true program ROM is detected in the step S13, the process returns to a normal program processing. On the other hand, in a case of an imitation program ROM, a correct value is not determined. In a next step S14, the CPU 12 displays a warning message such as "This program ROM (cartridge) is an imitation, and thus, not used in this machine", for example, on the display device 14 (FIG. 1), and forcedly terminates the program in a step S15. Therefore, in a case of the imitation, it becomes impossible to further continuously process the program and the steps S14 and S15 result in the forced termination of the program.

In addition, in the above description, in the step S13, a comparison operation determines whether or not the program data read-out in accordance with the second address data and the check data set in advance are coincident with each other, but the both may be not coincident with each other. The data may not have a predetermined relationship being set in advance. An arbitrary predetermined relationship, for example, may be a relationship that one is larger or smaller by a predetermined number in comparison with the other, or a relationship that both becomes coincident with each other when a predetermined calculation is applied to one (and/or the other), or a relationship that absolute values of both are equal to each other, or the like may be set.

In the FIG. 2 embodiment, if proper tools are utilized, the program data can be read from the program data storing unit 22 in a completed form, and copied. However, if only the program data is restored from the program data storing unit 22, it is impossible to execute the restored program if it is different from the authentic product.

More specifically, if only the program data is restored, in a case where the address processing unit 24 and the code storing unit 26 are not provided in a memory of a person who intends to unlawfully utilize the program data of the program ROM 18, when the program data designating the program check is read-out, the above-described address modification process cannot be executed, and therefore, the first address data A0–A15 not being modified is input to the program data storing unit 22. Therefore, even if such the check command exists, the program data is read from an address designated by the first address data A0–A15. In this case, the program data is different from the program data read from an address designated by the second address data A0'–A7'+A8–A15 obtained in FIG. 2 embodiment. Therefore, lack of coincidence is determined when comparing this data with the check data being set in advance in the step S13. If the discrimination result of no coincidence is obtained, the program is forcedly terminated.

In order to avoid the forced termination of the program, it is necessary to analyze the specific program data which commands the check start in the step S2 in FIG. 4 and the program step (address) thereof, and to further analyze all the elements such as the kind of calculation in the calculator 28 and the address calculation code, and the check data set in the check program (FIG. 2) and etc. In a case where the program ROM 18 is formed by a masked ROM, for example, it is very difficult to analyze such the elements, and therefore, a large-scale facility and a very long time are needed for the analysis. On the other hand, in a case where the elements such as the kind of the calculation in the calculator and the address calculation code are changed for each kind of the program ROM, game title in the case of a game cartridge, or a version of the program, even if all the elements of a given program ROM are analyzed, an analysis result cannot be applied to other program ROMs, and therefore, it is necessary for a person who intends to unlawfully utilize the program to repeat a new analysis of all the elements at each time. Therefore, according to the embodiment shown, in view of the time and cost necessary for the analysis, it is possible to substantially avoid the unlawful utilization of the program ROM.

Figure 6:
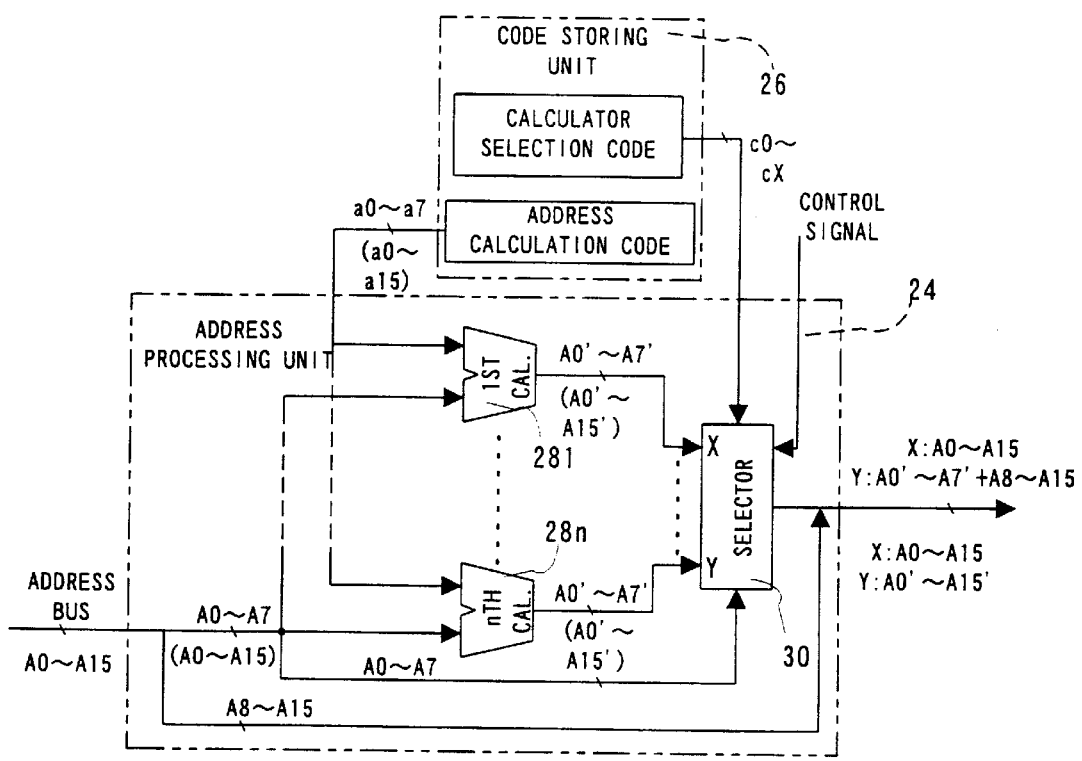
FIG. 6 is a block diagram showing a modified example of the address processing unit.

FIG. 6 is a modified example of the FIG. 2 embodiment. In the FIG. 6 embodiment, the calculating circuitry of the address processing unit 24 includes a plurality of (n) calculators 281–28n. The lower 8 bits A0–A7 of the first address data from the address bus are input to respective one inputs of the respective calculators 281–28n, and respective other inputs commonly receive the address calculation code a0–a7 of 8 bits output from the code storing unit 26. Furthermore, a calculator selection code c0–cX is stored in advance in the code storing unit 26 is applied to the selector 30 together with the control signal. The number of the bits of the calculator selection code c0–cX may be set according to the number of the calculators (n), and in a case where four (4) calculators 28 exist, the number of the bits is 2, and in a case of eight (8) calculators, 3 bits may be used. Then, the calculator selection code c0–cX is set to select any one of the plurality of calculators 281–28n.

In the FIG. 6 embodiment, as with the calculator 28 of the FIG. 2 embodiment, the respective calculators 281–28n calculate or modify the address, and therefore, a specific description of such address calculation is omitted. However, in the FIG. 6 embodiment, the respective calculators 281–28n execute different kinds of calculations, respectively. Therefore, if different calculators can be selected by the calculator selection code c0–cX for each kind of program ROM (game title) or a version of the program, the difficulty of the analysis of the program described in FIG. 2 is further increased. Therefore, the unlawful utilization is made to be more difficult.

There is a further advantage in the FIG. 6 embodiment. More specifically, in a case where only one calculator is formed in one chip as shown in FIG. 2 and the calculator is changed according to the kind of product or the version of the program, if the program ROM is a masked ROM, for example, it is necessary to change a printing mask at every time that the calculator is changed. In contrast, if a plurality of calculators 281–28n are incorporated as shown in FIG. 6, it is possible to select the calculator, that is, the kind of calculation only by changing the calculator selection code. On the other hand, the calculator selection code can be set in the same printing step of the address calculation code, and therefore, in FIG. 6 embodiment, it is possible to manufacture the program ROM with a lower cost in a case where the calculator is changed.

In the FIG. 6 embodiment, the selector 30 selects the input X when the control signal is applied thereto, and selects the input Y when no control signal is applied, and therefore, the first address data or the second address data is output in accordance with the absence or presence of the control signal. Furthermore, a case where all the bits of the address data A0–A15 are modified and processed is shown in brackets in FIG. 6. However, an operation of such a case can be easily understood in view of the previous description for the FIG. 2 embodiment, and therefore, is omitted here.

In addition, in the above-described embodiments, when the control signal exists the address data (second address data) obtained by calculating a portion or all portion of the address data by calculator 28 (281–28n) is output from the address processing unit 24. When the control signal does not exist, the address data output from CPU 12 (the first address data) is selected and output from the address processing unit 24. However, when no control signal exists, third address data obtained by a second calculation different from the calculation of the second address data on the first address data may be output.

Figure 7:
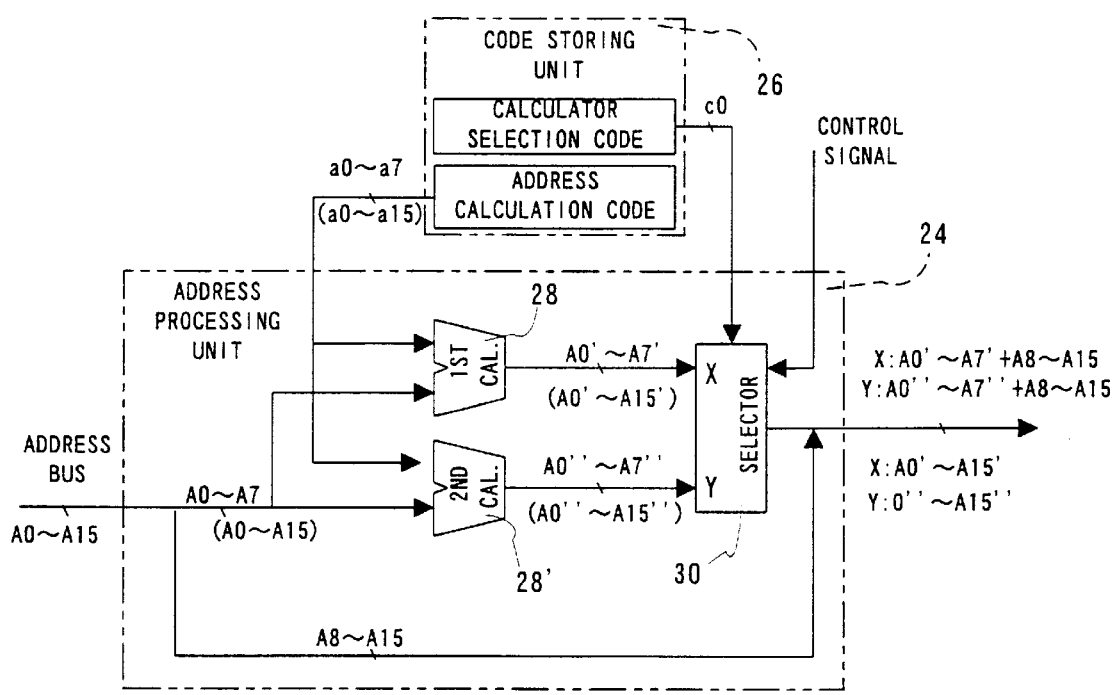
FIG. 7 is a block diagram showing another modified example of the address processing unit.

Such an embodiment is shown in FIG. 7. In the FIG. 7 embodiment, a second calculator 28' is provided in the address processing unit 24 in addition to the calculator 28 and the selector 30 similar to those of the FIG. 2 embodiment. Then, to respective one inputs of the calculators 28 and 28', the lower 8 bits A0–A7 of the address data A0–A15 (first address data) from the address bus of the CPU 12 are applied as they are. To respective other inputs of the calculators 28 and 28', the address calculation code a0–a7 of 8 bits being set in the code storing unit 26 are commonly applied. The calculators 28 and 28' are selected in a manner where the calculators 28 and 28' can execute a first kind of calculation and a second kind of calculation different from each other, respectively.

The calculator 28 outputs a first calculation result A0'–A7' of the address calculation code a0–a7 and the lower 8 bits A0–A7, and applies the same to the one input X of the selector 30. The calculator 28' outputs a second calculation result A0"–A7" of the address calculation code a0–a7 and the lower 8 bits A0–A7 to apply the same to the other input Y of the selector 30. One of these inputs A0'–A7' and A0"–A7" from the calculator 28 and 28' is selected by the selector 30. To the selector 30, the control signal, i.e. the write signal, for example is applied from the CPU 12 and the calculator selection code c0–cX stored in the code storing unit 26 is applied. Therefore, the selector 30 selects the output from the calculator 28, i.e. the input X when the control signal exists, to thereby output the address data A0'–A7' of the lower 8 bits processed by the calculator 28. The selector 30 selects the output of the calculator 28', i.e. the input Y when the control signal is not applied, thereby to output the address data A0"–A7" of the lower 8 bits processed by the calculator 28'.

The upper 8 bits A8–A15 of the address data A0–A15 are coupled to the output of the selector 30. When the control signal is applied, from the selector 30, that is, the address processing unit 24, the address data (second address data) of 16 bits in total of A0'–A7'+A8–A15 is output, and when the control signal is not applied, from the selector 30, the address data (the third address data) of 16 bits in total of A0"–A7"+A8–A15 is output.

In addition, in the FIG. 7 embodiment, as shown in FIG. 7 with brackets, all the bits of the address data A0–A15 may be calculated by the calculator 28 and the calculator 28'.

In the FIG. 7 embodiment, the first address data A0–A15 from the CPU 12 is not the address data by which the program data that the CPU 12 intends to normally execute can be read-out. That is, the first address data is merely false address data. Then, one of the first calculator 28 and the second calculator 28' changes or converts the first address data A0–A15 such that the program data that the CPU 12 intends to normally execute can be correctly read-out. That is, one of the second address data and the third address data is correct address data.

In the FIG. 7 embodiment, in a case where the program is intended to be unlawfully utilized, it is necessary to analyze not only the first calculator 28 but also the second calculator 28', and therefore, the difficulty of the analysis is further increased.

The above-described embodiments are provided with the address processing unit 24 in the program ROM 18 to process or modify the address to be applied to the program data storing unit 22. However, it is possible to process or modify outputted program data as well as the address data by applying the same concept to the program data read from the program data storing unit 22.

Figure 8:
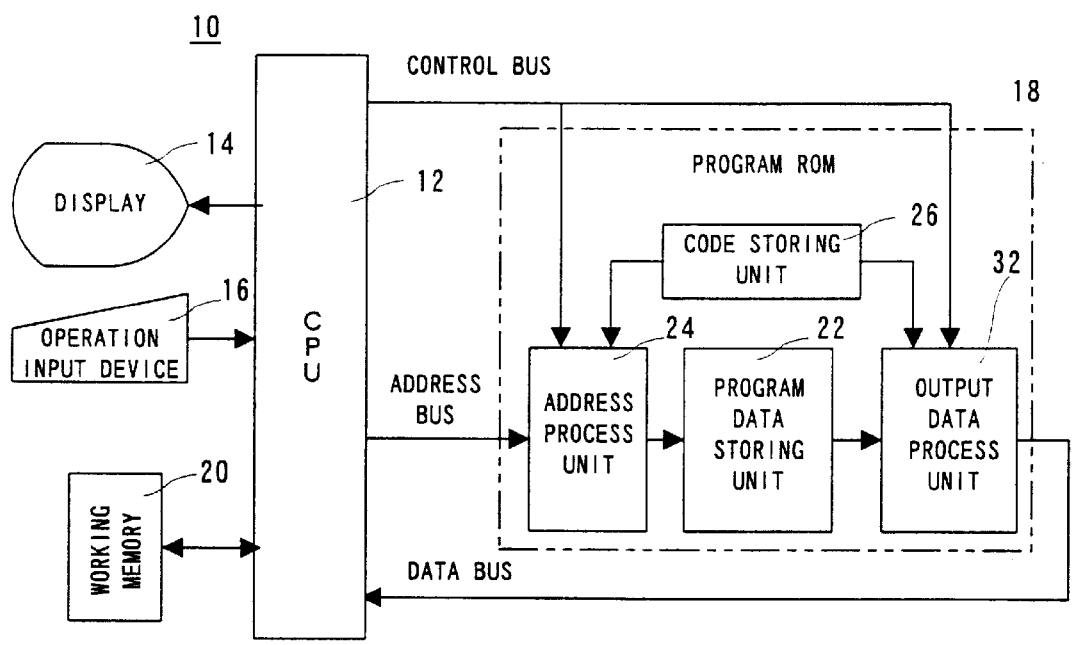
FIG. 8 is a block diagram showing another embodiment according to the present invention.

Such an embodiment is shown in FIG. 8. More specifically, in FIG. 8 embodiment, the program ROM 18 includes the address processing unit 24 and the code storing unit 26 shown in FIG. 1 embodiment in addition to the program data storing unit 22, and is further provided with an output data processing unit 32 which receives the program data outputted from the program data storing unit 22 and performs predetermined processing on the program data. Specifically, the output data processing unit 32 performs an operation similar to that of the above-described address processing unit 24 to process or modify the program data read from the program data storing unit 22. In this case, the control signal from the CPU 12 is applied to the address processing unit 24 and the output data processing unit 32, and both of the units 24 and the 32 are enabled in step S11 in FIG. 5.

In addition, in any one of the embodiments, the code storing unit 26 may be formed on the same chip of the program ROM 18 as the code generating means. However, the code generating means may be a means capable of applying an arbitrary code (data) to the calculating means, and therefore, the code storing unit 26 may be replaced with structure that arbitrary data is applied by a DIP switch and etc. or an external flash ROM storing arbitrary data in a manner that the data can be externally rewritten.

Furthermore, in the above-described embodiments, in a case of a non-authentic program, the execution of the program is forcedly terminated at once. However, the program may be forced terminated after a predetermined time, or in a case of a game, the forced termination may be replaced with other processing such as a change of parameters of characters or elimination of backup data of the game or returning the game to an initial state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor storage device for storing program data to be executed by a central processing unit and for outputting the program data in response to addresses designated by address data, comprising:
    a program data store for storing the program data;
    a code generator for generating an address calculation code; and
    address processing circuitry for receiving first address data output from the central processing unit,
    wherein the address processing circuitry is configured to output to the program data store second address data obtained by performing a calculation on at least a portion of the first address data based on an address calculation code when a control signal is at a predetermined logic level and the first address data when the control signal is not at said predetermined logic level,
    wherein the address processing circuitry includes a plurality of calculators, respective ones of which can execute different kinds of calculations using the first address data and the address calculation code to output different second address data,
    wherein the code generator is configured to generate a calculator selection code for selecting any one of the plurality of calculators, and
    wherein the address processing circuitry is configured to output the second address data associated with the calculator selected by the calculator selection code or the first address data.

2. A semiconductor storage device according to claim 1, wherein the address processing circuitry includes selection circuitry for outputting the second address data when the control signal is applied thereto and the first address data when the control signal is not applied thereto.

3. A semiconductor storage device according to claim 1, wherein the program data store includes specific program data which commands the output of the control signal during execution of the program by the central processing unit.

4. A semiconductor storage device according to claim 1, wherein the program data store, the code generating means and the address processing circuitry are formed on a single semiconductor chip.

5. A semiconductor storage device according to claim 1, wherein the program data store and the code generator include a flash memory.

6. A program authenticating system, comprising:
    a read-only program storage unit for storing program data, and
    a central processing unit for executing the program data by reading the program data from the program storage unit and determining whether the program is an authentic program,
    wherein the program storage unit includes:
        a program data store for storing the program data,
        a code generator for generating an address calculation code, and
        address processing circuitry for receiving first address data output from the central processing unit,
    wherein the address processing circuitry is configured to output to the program storage unit second address data obtained by performing a calculation on at least a portion of the first address data based upon the address calculation code when a control signal is applied from the central processing unit and the first address data when no control signal is applied, and
    wherein the central processing unit is operable to:
        apply the control signal to the address processing circuitry during execution of the program data,
        output during execution of the program data the first address data after the control signal is applied, and
        determine during the execution of the program data the authenticity of the program storage unit by determining whether a predetermined relationship exists between the program data read from the program storage unit in accordance with the second address data and stored check data.

7. A program authenticating system according to claim 6, wherein a specific program is stored in the program store, and the control signal is applied at a time when the specific program is read-out.

8. A program system according to claim 6, wherein the central processing unit is operable to terminate the program execution when a non-authentic program storage unit is detected.

9. A program authenticating method in an information processing apparatus having a read-only program storage device which fixedly stores program data and a central processing unit which executes a program by reading the program data from the program storage device, comprising:
generating an address calculation code;
outputting a first address;
outputting second address data obtained by applying a calculation to at least a portion of first address data based on the address calculation code when a control signal is output and applying the second address data to the program data storage device;
applying the first address data to the program storage device when the control signal is not output; and
determining during an execution of the program whether the program data read from the program data store according to the second address data and prestored check data have a predetermined relationship.

10. A semiconductor storage device for storing program data to be executed by a central processing unit and for outputting the program data in response to addresses designated by address data, comprising:
a program data store for storing the program data including a check command and check data;
a code generator for generating an address code; and
address processing circuitry for receiving first address data output from the central processing unit including:
processing circuitry for performing a modifying operation on at least a portion of the first address data based on the address code and generating second address data, and
a selector for outputting the first address data when a control signal is in a first state and the second address data when the control signal is in a second state and for applying the selected address data to the program data store,
wherein the control signal is received by the selector in the second state when the central processing unit executes the check command.

11. The semiconductor storage device in claim 10, wherein the second address is used to retrieve data from the program data store, the retrieved data useable to determine whether to permit further execution of the program in the program data store.

12. The semiconductor storage device in claim 11, wherein if the retrieved data does not match the check data, further execution of the program in the program data store is not permitted.

13. The semiconductor storage device in claim 10, wherein the check command, check data, and second address are used by the central processing unit to determine whether the program data stored in the program data store is an authorized copy of the program data.

14. The semiconductor storage device in claim 10, wherein the calculating circuitry includes a plurality of calculators, each of which is configured execute different calculations using the first address data and the address calculation code to output different second address data,
wherein the code generator is configured to generate a calculator selection code for selecting any one of the plurality of calculators, and
wherein the selector is configured to select the second address data associated with the calculator selected by the calculator selection code or the first address data.

15. A semiconductor storage device according to claim 10, wherein the program data store, the code generating means, and the address processing circuitry are formed on a single semiconductor chip.

16. A semiconductor storage device according to claim 10, wherein the program data store and the code generator include a flash memory.

17. A semiconductor storage device for storing program data to be executed by a central processing unit and for outputting the program data in response to addresses designated by address data, comprising:
a program data store for storing the program data including a check command and check data;
a code generator for generating an address code; and
address processing circuitry for receiving first address data output from the central processing unit including:
processing circuitry for performing a first modifying operation on at least a portion of the first address data based on the address code and generating second address data and for performing a second modifying operation on at least a portion of the first address data based on the address code and generating third address data, and
a selector for outputting the second address data when a control signal is in a first state and the third address data when the control signal is in a second state and for applying the selected address data to the program data store,
wherein the control signal is received by the selector in the second state when the central processing unit executes the check command.

18. The semiconductor storage device in claim 17, wherein the third address is used to retrieve data from the program data store, the retrieved data useable to determine whether to permit further execution of the program in the program data store.

19. The semiconductor storage device in claim 18, wherein if the retrieved data does not match the check data, further execution of the program in the program data store is not permitted.

20. The semiconductor storage device in claim 17, wherein the check command, check data, and third address are used by the central processing unit to determine whether the program data stored in the program data store is an authorized copy of the program data.

21. A semiconductor storage device for storing program data to be executed by a central processing unit and for outputting the program data in response to addresses designated by address data, comprising:
a program data store for storing the program data including a check command and check data;
a code generator for generating an address code and an information code; and
address processing circuitry for receiving first address data output from the central processing unit including:
first processing circuitry for performing a modifying operation on at least a portion of the first address data based on the address code and generating second address data, and
a first selector for outputting the first address data when a first control signal is in a first state and the second address data when the first control signal is in a second state and for applying the selected address data to the program data store,
output data process circuitry for receiving information output from the program data store including:
second processing circuitry for performing a modifying operation on at least a portion of the program data store output information based on the information code and generating modified program data, and a second selector for outputting unmodified program data when a second control signal is in a first state and modified program data when the second control signal is in a second state.

22. The semiconductor storage device in claim 21, wherein the second address and the modified program data are used by the central processing unit to determine whether the program data stored in the program data store is an authorized copy of the program data.

23. A program authenticating system, comprising:

a program storage unit including:

a program data store for storing program data, a code generator for generating an address code, and address processing circuitry for receiving first address data and modifying at least a portion of the first address data based upon the address code to generate second address data, and a central processing unit for generating the first address data, executing the program data read from the program storage unit, and determining whether the program is an authentic program, wherein the central processing unit is configured to determine the; authenticity of the program storage unit during execution of the program by instructing the address processing circuitry to output the second address data and comparing program data read from the program storage unit in accordance with the second address data with check data.

24. A program authenticating system according to claim 23, wherein the central processing unit is configured to terminate program execution when a non-authentic program storage unit is detected.

25. A program authenticating system according to claim 24, wherein the central processing unit is configured to detect a non-authentic program storage unit when the program data read from the program storage unit in accordance with the second address data do not match the check data.

26. A program authenticating system according to claim 25, wherein the check data is stored as part of the program data in the program storage unit and a check command associated with the check data is stored as part of the program data.

27. A program authenticating system according to claim 26, wherein when the central processing unit executes the check command, the address processing circuitry is configured to output the second address data.

28. A program authenticating system according to claim 23, wherein the address processing circuitry includes a selector for receiving a control signal, and wherein a value of the control signal determines which of the first address data or the second address data is output from the address processing unit.

29. A program authenticating system according to claim 28, wherein the control signal is a write signal.

30. A program authenticating system according to claim 23, wherein the address processing circuitry includes a plurality of address calculators, each of which is configured execute different calculations using the first address data and the address calculation code to output different second address data, wherein the code generator is configured to generate a calculator selection code for selecting any one of the plurality of calculators, and wherein the central processing unit is configured to initiate selection of (1) the second address data associated with the calculator selected by the calculator selection code or (2) the first address data.

31. An address control method for a semiconductor storage device including a program data store for storing program data to be executed by a central processing unit, the program data including a check command and check data, comprising:

generating an address code;

receiving first address data output from the central processing unit modifying at least a portion of the first address data based on the address code and generating second address data;

receiving a predetermined control signal during execution of the check command in the stored program;

outputting the second address data when the predetermined control signal is received and otherwise outputting the first address data;

applying the output address data to the program data store.

32. The method in claim 31, wherein the second address is used to retrieve data from the program data store, the retrieved data useable to determine whether to permit further execution of the program in the program data store.

33. The method in claim 32, wherein if the retrieved data does not match the check data, further execution of the program in the program data store is not permitted.

34. The method in claim 31, wherein the check command, check data, and second address are used by the central processing unit to determine whether the program data stored in the program data store is an authorized copy of the program data.

35. An address control method for a semiconductor storage device including a program data store for storing program data to be executed by a central processing unit, the program data including a check command and check data, comprising:

generating an address code;

receiving first address data output from the central processing unit performing a first modifying operation on at least a portion of the first address data based on the address code and generating second address data;

performing a second modifying operation on at least a portion of the first address data based on the address code and generating third address data;

receiving a predetermined control signal during execution of the check command in the stored program;

outputting the third address data when the predetermined control signal is received and otherwise outputting the second address data;

applying the output address data to the program data store.

36. A program authenticating method in an information processing apparatus having a program storage device storing program data and a central processing unit which executes the stored program data, comprising:

generating an address code;

receiving first address data;

modifying at least a portion of the first address data based upon the address code to generate second address data;

determining the authenticity of the program storage device by outputting the second address data during execution of the program and comparing program data read from the program storage unit in accordance with the second address data with check data.

37. A program authenticating method according to claim 36, further comprising:

terminating program execution when a non-authentic program storage device is detected.

38. A program authenticating method according to claim 37, further comprising:

detecting a non-authentic program storage device when the program data read from the programs storage unit in accordance with the second address data does not match the check data.

39. A program authenticating method according to claim 38, wherein the check data is stored as part of the program data in the program storage unit and a check command associated with the check data is stored as part of the program data.

40. A program authenticating method according to claim 39, further comprising:

outputting the second address data when or near when the check command is executed.

41. A program authenticating method according to claim 36, further comprising:

receiving a control signal, and determining which of the first address data or the second address data is output based on a value of the control signal.

* * * * *